(12) United States Patent
Iwai et al.

(10) Patent No.: US 7,667,782 B2
(45) Date of Patent: Feb. 23, 2010

(54) LIQUID CRYSTAL DISPLAY DEVICE CAPABLE OF RESTRAINING DEFORMATION OF A CABINET BY HEAT

(75) Inventors: Takeo Iwai, Osaka (JP); Masuo Ogawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 786 days.

(21) Appl. No.: 11/285,788

(22) Filed: Nov. 22, 2005

(65) Prior Publication Data
US 2006/0146223 A1 Jul. 6, 2006

(30) Foreign Application Priority Data
Nov. 22, 2004 (JP) ............... 2004-006843 U

(51) Int. Cl.
*H04N 5/445* (2006.01)
(52) U.S. Cl. .................................. 348/794
(58) Field of Classification Search ............ None
See application file for complete search history.

(56) References Cited

U.S. PATENT DOCUMENTS

| | | | |
|---|---|---|---|
| 5,629,056 A * | 5/1997 | Koike et al. ............. 428/1.26 |
| 6,353,536 B1 * | 3/2002 | Nakamura et al. ......... 361/686 |
| 2003/0066672 A1 * | 4/2003 | Watchko et al. ............ 174/50 |
| 2004/0207588 A1 * | 10/2004 | Shiomi ..................... 345/87 |
| 2005/0090567 A1 * | 4/2005 | Koike et al. ................ 521/40 |
| 2006/0146223 A1 * | 7/2006 | Iwai et al. ................. 349/58 |

FOREIGN PATENT DOCUMENTS

| JP | 2000-112393 | 4/2000 |
|---|---|---|
| JP | 2002-189426 | 7/2002 |
| JP | 2004-187271 | 7/2004 |

* cited by examiner

*Primary Examiner*—Paulos M Natnael
(74) *Attorney, Agent, or Firm*—Osha • Liang LLP

(57) ABSTRACT

A rear cover made of resin of the liquid crystal television is integrally formed to extend to a printed circuit board at a vicinity of a position in correspondence with an electronic part of the printed circuit board and at a vicinity of a center of a accommodating portion of a rear cover and includes a boss having a screw inserting hole at a front end thereof. By inserting and fastening a screw for fixing a frame made of a metal of a liquid crystal display panel and the printed circuit board into the screw inserting hole of the boss of the rear cover, the frame made of a metal of the liquid crystal display panel and the printed circuit board and the rear cover made of resin are fixed.

4 Claims, 5 Drawing Sheets

LIQUID CRYSTAL DISPLAY DEVICE CAPABLE OF RESTRAINING DEFORMATION OF A CABINET BY HEAT

BACKGROUND OF THE INVENTION

1. Field of the Invention

The invention relates to a liquid crystal television and a liquid crystal display apparatus, particularly relates to a liquid crystal television and a liquid crystal display apparatus having a cabinet.

2. Description of the Related Art

In a related art, a liquid crystal television (liquid crystal display apparatus) having a cabinet is known. In such a liquid crystal television, a printed circuit board for controlling the apparatus is provided at inside of the apparatus. A printed circuit board of a liquid crystal television or the like is generally attached with an electronic part generating heat of an inverter or the like. In this case, in the background art, there is a drawback that there is a case of deforming the cabinet made of resin by heat generated by the electronic part of the printed circuit board. Meanwhile, in a background art, a structure of forming a boss at a cabinet of a display apparatus is known (refer to, for example, JP-A-2000-112393 and JP-A-2004-187271).

JP-A-2000-112393 discloses a plasma display apparatus (display apparatus) for displaying an image or the like by using PDP (plasma display panel) held by a cabinet. According to the plasma display apparatus disclosed in JP-A-2000-112393, a plurality of bosses are formed at an inner face of the cabinet for supporting a rear side of the apparatus, and PDP is contained at inside of the cabinet by holding a back face side of PDP by the bosses. According to the plasma display apparatus disclosed in JP-A-2000-112393, PDP per se is operated as a heat source by generating heat.

According to the plasma display apparatus disclosed in JP-A-2000-112393, although the back face side of PDP is held by the bosses formed at the cabinet, the cabinet and PDP are not fixed at portions of the bosses and therefore, there is a drawback that there is a case of deforming the cabinet by heat generated by PDP.

Further, JP-A-2004-187271 discloses a display apparatus for pinching to fix a speaker box arranged on a lower side in the apparatus by a front cabinet (cabinet) and a back cabinet (cabinet). According to the display apparatus disclosed in JP-A-2004-187271, bosses are respectively provided at center positions of the front cabinet and the back cabinet to be opposed to each other, and an upper end portion of the speaker box is formed with an attaching portion having a vibration isolating member. The speaker box is fixed to a lower side at inside of the apparatus by fastening together the attaching portion of the speaker box and the lower side by a single screw while pinching the boss of the front cabinet and the boss of the back cabinet. Thereby, vibration generated at the speaker box is efficiently dispersed to the front cabinet and the back cabinet. A liquid crystal panel for displaying an image or the like is arranged at an upper side of the speaker box.

Although according to the display apparatus disclosed in JP-A-2004-187271, the back cabinet (cabinet) and the front cabinet are fixed at portions of the bosses, the apparatus is intended to control to transmit vibration generated at the speaker box and it is not assumed that there is a heat source at inside of the apparatus. Thereby, when a printed circuit board or the like including a portion constituting a heat source is arranged, for example, between the liquid crystal panel and the back cabinet (cabinet) and the heat source portion of the printed circuit board is arranged at a position remote from the boss formed at the center of the back cabinet, a region remote from the boss of the back cabinet is deformed by heat generated by the heat source portion of the printed circuit board and therefore, there is a drawback that it is difficult to restrain the back cabinet from being deformed.

Hence, in a related art, a technology of fixing a cabinet to a member attached to a heat source is proposed (refer to, for example, JP-A-2002-189426).

JP-A-2002-189426 discloses a frame structure of a PDP apparatus (display apparatus) holding PDP for displaying an image or the like at inside of a cabinet and preventing PDP from being destructed by carrying out a reinforcement against a torsional deformation of the cabinet by attaching frames for reinforcement respectively to faces of PDP and the cabinet opposed to each other. According to the frame structure of the PDP apparatus disclosed in JP-A-2002-189426, a projection (boss) having a screw hole is formed at the frame attached to PDP and a screw inserting hole is formed at the frame attached to the cabinet. By inserting a screw into the screw hole of the frame on a side of PDP to fasten by way of the screw inserting hole of the frame on a side of the cabinet, PDP and the cabinet are fixed. Further, according to JP-A-2002-189426, by using aluminum or the like excellent in a heat conductivity as a material of the frames attached to PDP and the cabinet, heat generated by PDP is efficiently diffused to the cabinet. In this case, the cabinet is connected to PDP by way of the two frames and therefore, even when heat is diffused to the cabinet, deformation of the cabinet can be restrained.

SUMMARY OF THE INVENTION

However, according to the frame structure of the PDP apparatus (display apparatus) disclosed in JP-A-2002-189426, it is necessary to attach the frames respectively at PDP and the cabinet in order to restrain deformation of the cabinet by heat generated by PDP and therefore, a problem that a number of parts is increased is posed.

The invention has been carried out in order to resolve the above-described problem and it is an object thereof to provide a liquid crystal television and a liquid crystal display apparatus capable of restraining deformation of a cabinet by heat without increasing a number of parts.

According to a first aspect of the invention, a liquid crystal television includes: a liquid crystal display panel including a frame made of a metal; a printed circuit board being fixed to the frame of the liquid crystal display panel by a screw, the printed circuit board having a heat source at a predetermined position; and a cabinet being made of a resin. The cabinet is arranged to be opposite to the frame of the liquid crystal display panel by interposing the printed circuit board therebetween. The cabinet includes a boss and a recess portion capable of including the liquid crystal display panel and the printed circuit board inside of the cabinet. The boss is integrally formed with the cabinet so as to extend to the printed circuit board at a vicinity of a position in correspondence with the heat source of the printed circuit board and at a vicinity of a center of the recess portion of the cabinet. The boss has a screw inserting hole at a front end thereof. The frame and the printed circuit board and the cabinet are fixed by inserting and fastening the screw into the screw inserting hole of the boss.

According to the liquid crystal television according to the first aspect, as described above, the cabinet made of the resin can be fixed to the liquid crystal display panel and the printed circuit board at the portion of the boss by forming the boss extended to the printed circuit board and having the screw inserting hole at the front end at the vicinity of the position of the cabinet made of the resin in correspondence with the heat source of the printed circuit board and fixing the liquid crystal display panel and the printed circuit board and the cabinet by inserting and fastening the screw into the screw inserting hole of the boss and therefore, the cabinet made of the resin can be restrained from being deformed by heat generated by the heat source of the printed circuit board. Further, by fixing the liquid crystal display panel and the printed circuit board and the cabinet by inserting and fastening the screw for fixing the liquid crystal display panel and the printed circuit board into the screw inserting hole of the boss, a portion of fixing the liquid crystal display panel and the printed circuit board of the background can be used for fixing the liquid crystal display panel and the printed circuit board and the cabinet as it is and therefore, a number of screws used in the fixing can be restrained from being increased. Thereby, the liquid crystal display panel and the printed circuit board and the cabinet can be fixed without increasing a number of parts. Further, it is not necessary to newly provide a region for screwing on the printed circuit board by fixing the liquid crystal display panel and the printed circuit board and the cabinet by inserting and fastening the screw for fixing the liquid crystal display panel and the printed circuit board into the screw inserting hole of the boss and therefore, the printed circuit board can be prevented from being large-sized. Further, by fixing the cabinet made of the resin to the frame made of the metal, since the metal is a material having a strength higher than that of the resin and difficult to be deformed by heat, a base portion fixed with the cabinet made of the resin is difficult to be destructed by impact or deformed by heat. Thereby, in comparison with a case of fixing the cabinet made of the resin to a member made of resin, a strength of fixing the cabinet made of the resin can be increased and the cabinet made of the resin can further effectively be restrained from being deformed by heat. Further, by forming the boss at the vicinity of the center of the recess portion of the cabinet made of the resin capable of including the liquid crystal display panel and the printed circuit board at inside thereof, even when the cabinet made of the resin is formed in the recess shape difficult to diverge heat to outside for including the liquid crystal display panel and the printed circuit board at inside thereof, by the boss, the vicinity of the center of the recess portion of the cabinet which is liable to be deformed can be fixed and therefore, the cabinet can effectively be restrained from being deformed by heat. Further, by integrally forming the boss with the cabinet made of the resin, in comparison with the case of forming the boss separately from the cabinet made of the resin, a number of parts can be restrained from being increased.

According to a second aspect of the invention, there is provided a liquid crystal display apparatus including: a liquid crystal display panel; a board being fixed to the liquid crystal display panel by a screw, the board including a heat source at a predetermined position; and a cabinet being made of a resin, the cabinet being arranged to be opposed to the liquid crystal display panel by interposing the board therebetween, the cabinet being formed to extend to the board at a vicinity of a position in correspondence with a heat source of the board, and the cabinet including a boss having a screw inserting hole at a front end thereof. The liquid crystal display panel and the board and the cabinet are fixed by inserting and fastening the screw into the screw inserting hole of the boss.

According to the liquid crystal display apparatus according to the second aspect, as described above, the cabinet made of the resin can be fixed to the liquid crystal display panel and the board at the portion of the boss by fixing the liquid crystal display panel and the board and the cabinet by forming the boss extended to the board at the vicinity of the position of the cabinet made of the resin in correspondence with the heat source of the board and having the screw inserting hole at the front end and inserting and fastening the screw into the screw inserting hole of the boss and therefore, the cabinet made of the resin can be restrained from being deformed by heat generated at the heat source of the board. Further, a portion of fixing the liquid crystal display panel and the board of the background art can be used for fixing the liquid crystal display panel and the board and the cabinet as it is by fixing the liquid crystal display panel and the board and the cabinet by inserting and fastening the screw for fixing the liquid crystal display panel and the board into the screw inserting hole of the boss and therefore, a number of screws used in the fixing can be restrained from being increased. Thereby, the liquid crystal display panel and the board and the cabinet can be fixed without increasing a number of parts. Further, it is not necessary to newly provide a region for screwing on the board by fixing the liquid crystal display panel and the board and the cabinet by inserting and fastening the screw for fixing the liquid crystal display panel and the board into the screw inserting hole of the boss and therefore, the board can be restrained from being large-sized.

According to the liquid crystal display apparatus according to the second aspect, preferably, the liquid crystal display panel includes a frame made of a metal, and the cabinet made of the resin is fixed to the frame made of the metal by the screw. When constituted in this way, since the metal is a material having a strength higher than that of the resin and difficult to be deformed by heat, a base portion fixed with the cabinet made of the resin is difficult to be destructed by impact or deformed by heat. Thereby, in comparison with the case of fixing the cabinet made of the resin to a member made of resin, a strength of fixing the cabinet made of the resin can be increased and the cabinet made of the resin can further effectively be restrained from being deformed by heat.

According to the liquid crystal display apparatus according to the second aspect, preferably, the cabinet made of the resin includes a recess portion capable of including the liquid crystal display panel and the board at inside thereof, and the boss is formed at a vicinity of a center of the recess portion of the cabinet. When constituted in this way, even when the cabinet made of the resin is formed in the recess shape difficult to diverge heat to outside for including the liquid crystal display panel and the board at inside thereof, by the boss, the vicinity of the center of the recess portion of the cabinet which is liable to be deformed can be fixed and therefore, a cabinet can effectively be restrained from being deformed by heat.

According to the liquid crystal display apparatus according to the second aspect, preferably, the boss is integrally formed with the cabinet made of the resin. When constituted in this way, in comparison with a case of forming the boss separately from the cabinet made of the resin, a number of parts can be restrained from being increased.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Embodiments will be explained in reference to the drawings as follows.

Figure 1:
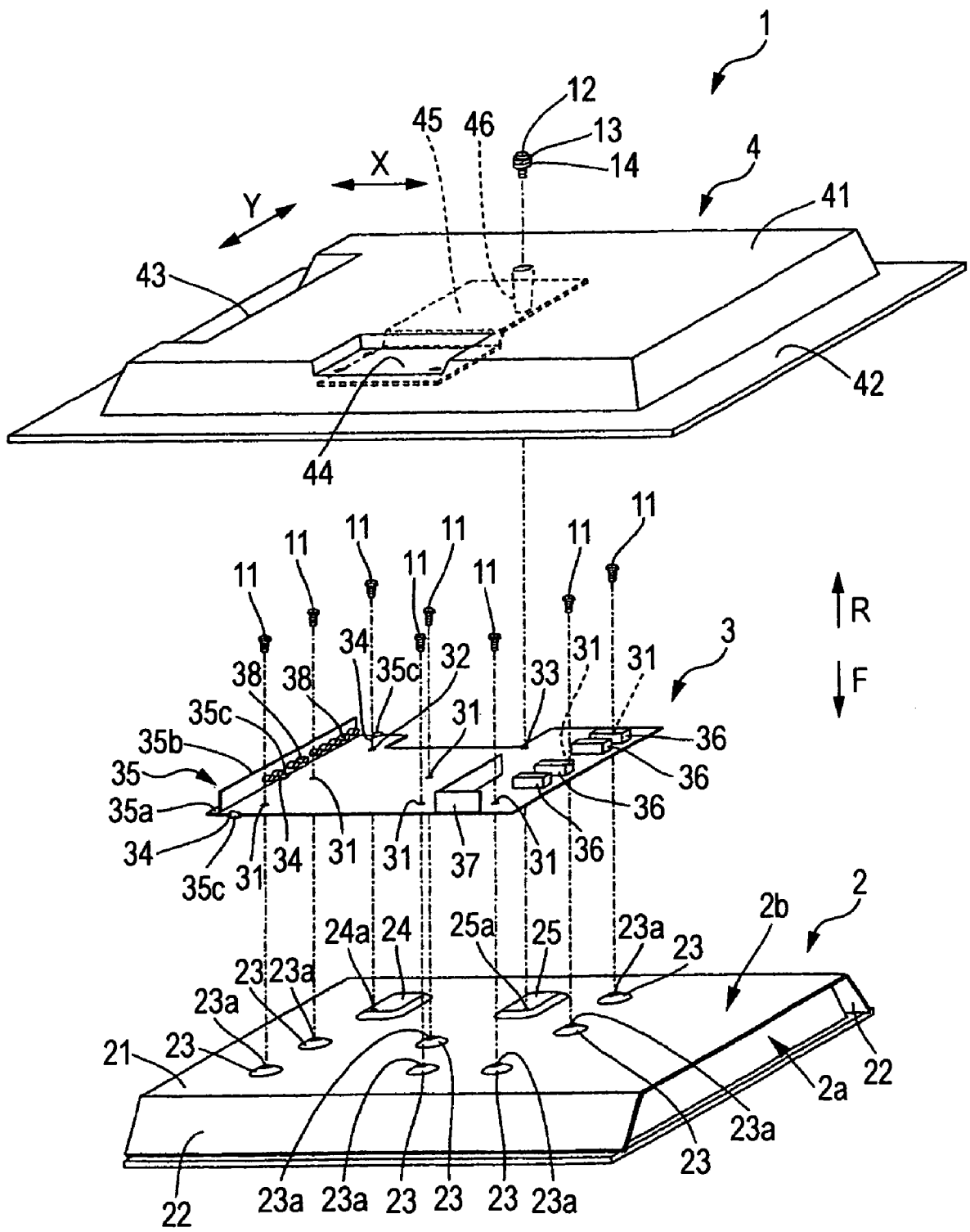
FIG. 1 is a disassembled perspective view showing a total constitution of a liquid crystal television according to an embodiment of the invention.

FIG. 1 is a perspective view showing a total constitution of a liquid crystal television according to an embodiment of the invention, FIG. 2 through FIG. 7 are views for explaining a structure of the liquid crystal television according to the embodiment shown in FIG. 1. Further, FIG. 8 is a view for explaining a step of integrating the liquid crystal television according to the embodiment shown in FIG. 1. First, the total constitution of the liquid crystal television 1 according to the embodiment will be explained in reference to FIG. 1 through FIG. 7. Further, the liquid crystal television 1 is an example of a 'liquid crystal display apparatus' of the embodiment. Further, an arrow mark F and an arrow mark R in the drawings respectively show a front direction and a rear direction of the liquid crystal television 1.

Figure 2:
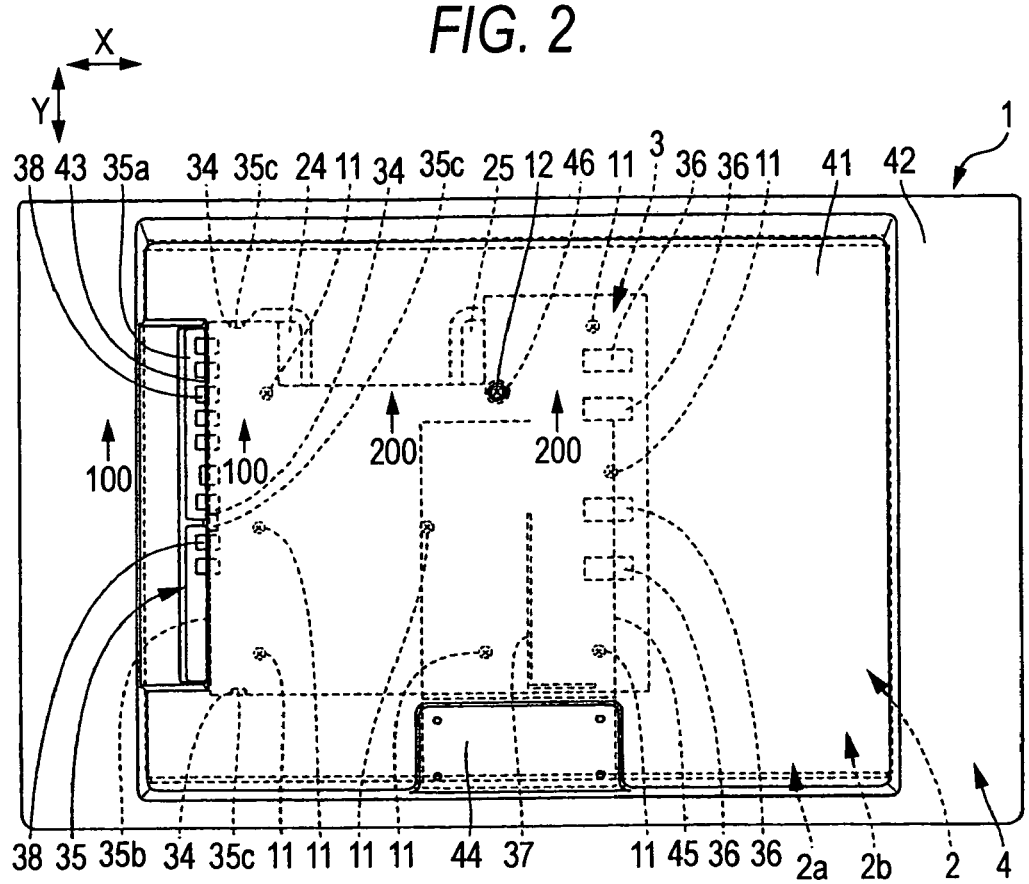
FIG. 2 is a plane view showing the liquid crystal television according to the embodiment shown in FIG. 1.

As shown by FIG. 1 and FIG. 2, the liquid crystal television 1 according to the embodiment is provided with a liquid crystal display panel 2, a PCB (printed circuit board) board 3 attached to a rear face (arrow mark R direction) side of the liquid crystal display panel 2, and a rear cover 4 attached to the liquid crystal display panel 2 by interposing the PCB board 3. Further, the PCB board 3 is an example of a 'printed circuit board' and a 'board' of the embodiment, and the rear cover 4 is an example of a 'cabinet' of the embodiment.

Figure 3:
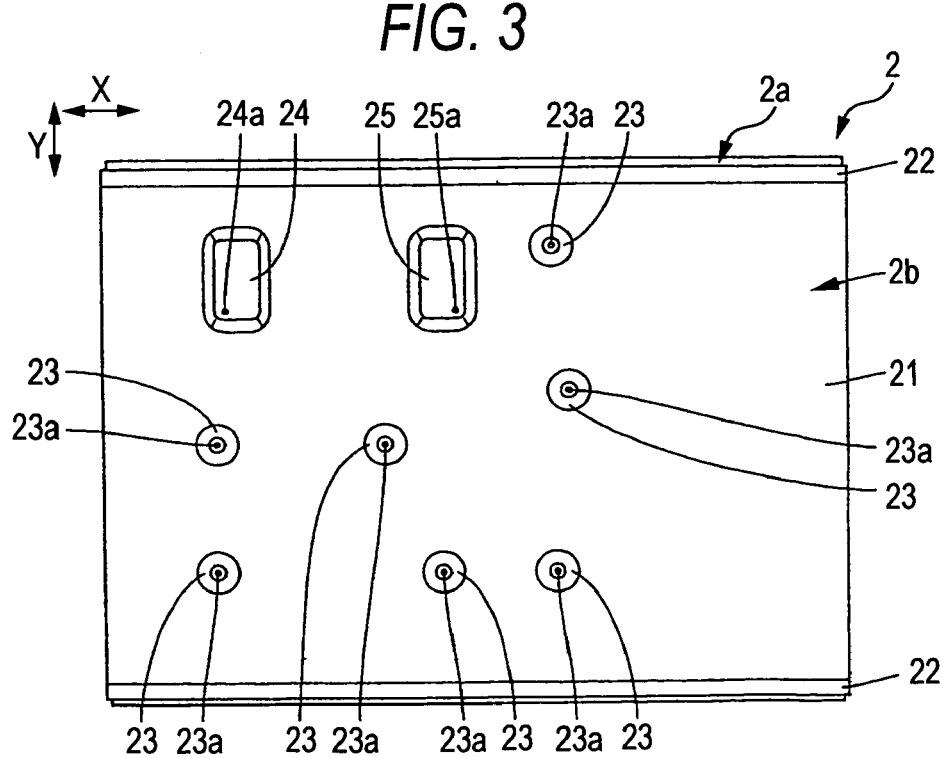
FIG. 3 is a plane view showing a liquid crystal display panel of the liquid crystal television according to the embodiment shown in FIG. 1.

The liquid crystal display panel 2 includes a display portion 2a and a frame 2b made of a metal. The display portion 2a is disposed on a front face (arrow mark F direction) side of the liquid crystal television 1 and is provided with a function of displaying an image or the like. As shown by FIG. 1, the frame 2b made of a metal is attached to a rear face side of the display portion 2a. As shown by FIG. 1 and FIG. 3, the frame 2b made of a metal is constituted by a flat portion 21, and a pair of inclined portions 22 formed continuously to both ends in Y direction of the flat portion 21. The flat portion 21 is formed with seven support portions 23 projected in a conical shape and support portions 24 and 25 projected in a shape of a pyramid. The support portions 23, 24, and 25 include screw holes 23a, 24a and 25a formed with female screws.

Figure 4:
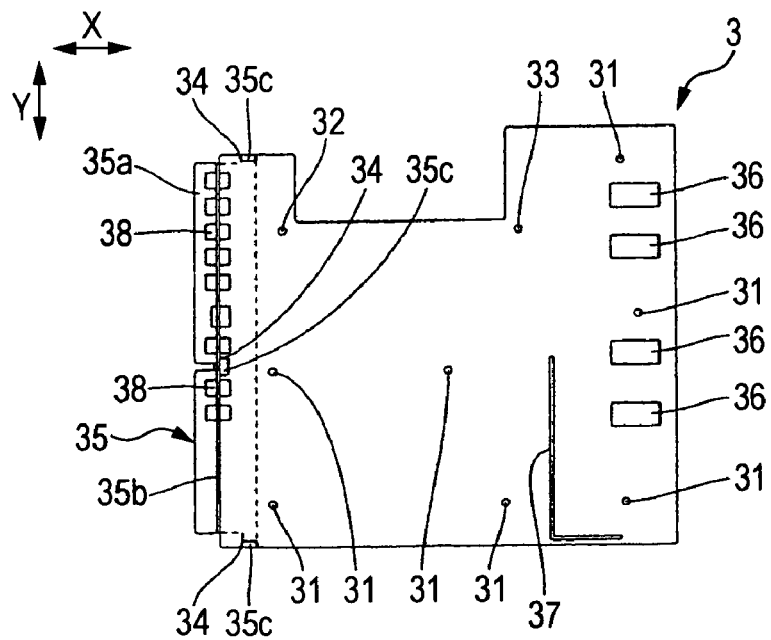
FIG. 4 is a plane view showing a PCB board of the liquid crystal television according to the embodiment shown in FIG. 1.

As shown by FIG. 1 and FIG. 4, the PCB board 3 includes seven hole portions 31, hole portions 32 and 33, and three notched portions 34. The hole portions 31, 32 and 33 are respectively formed at positions in correspondence with the screw holes 23a, 24a and 25a of the support portions 23, 24 and 25 formed at the flat portion 21 of the frame 2b. The PCB board 3 and the frame 2b of the liquid crystal display panel 2 are fixed to each other by inserting and fastening screws 11 (refer to FIG. 1) into the corresponding screw holes 23a and 24a of the frame 2b by way of the hole portions 31 and 32 of the PCB board 3. Further, the notched portions 34 are respectively formed at one end in X direction and both ends in Y direction of the PCB board 3. The three notched portions 34 are provided for attaching a terminal holder 35, mentioned later, at the PCB board 3.

Figure 6:
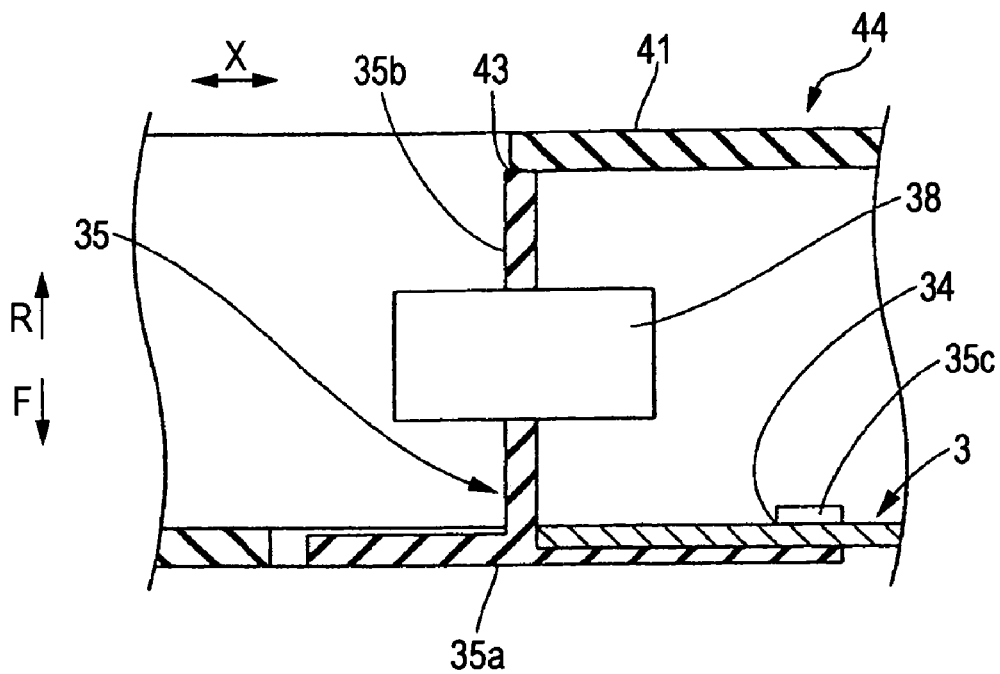
FIG. 6 is a sectional view taken along a line 100-100 in FIG. 2.

Further, as shown by FIG. 1 and FIG. 4, the PCB board 3 is attached with the terminal holder 35, four electronic parts 36, and a heat radiating plate 37. The terminal holder 35 is attached at one end in X direction of the PCB board 3. As shown by FIG. 1, FIG. 4 and FIG. 6, the terminal holder 35 includes an attaching portion 35a in parallel with the PCB board 3, a holder portion 35b orthogonal to the attaching portion 35a and three hook portions 35c formed at the attaching portions 35a. The holder portions 35b are attached with a plurality of terminals 38. The three hook portions 35c attach the terminal holder 35 to the PCB board 3 by being respectively engaged with the three notched portions 34 formed at corresponding positions of the PCB board 3. Further, as shown by FIG. 4, the four electronic parts 36 are attached to other end side in X direction on the PCB board 3 along Y direction spaced apart from each other by predetermined intervals. Further, the electronic parts 36 are examples of 'heat source' of the embodiment comprising an inverter or the like for generating heat in being operated. Further, the heat radiating plate 37 is formed in an L-like shape and is attached to extend from one end in Y direction to a vicinity of a center in Y direction of the PCB board 3. Further, the heat radiating plate 37 is attached to the PCB board 3 to surround two of the electronic parts 36 on one side in Y direction among the four electronic parts 36. Thereby, heat generated from the two electronic parts 36 on one end side in Y direction among the four electronic parts 36 is diffused by the heat radiating plate 37.

Figure 5:
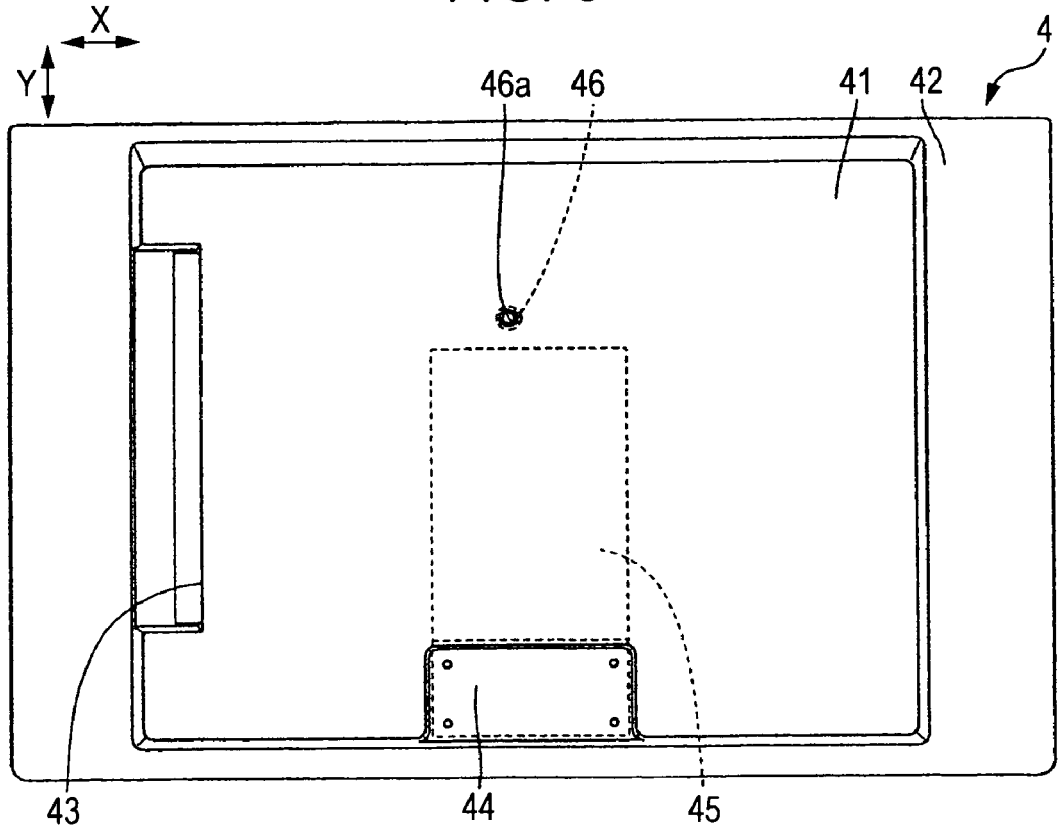
FIG. 5 is a plane view showing a rear cover of the liquid crystal television according to the embodiment shown in FIG. 1.

As shown by FIG. 1, FIG. 2 and FIG. 5, the rear cover 4 made of resin is constituted by an accommodating portion 41 capable of including the liquid crystal display panel 2 and the PCB board 3, and an edge portion 42 formed at a surrounding of the accommodating portion 41. Further, the accommodating portion 41 is an example of a 'recess portion' of the embodiment. The accommodating portion 41 is formed with an opening portion 43, and an attaching recess portion 44. The opening portion 43 is formed at one end in X direction of the accommodating portion 41 in correspondence with the terminal holder 35 attached to the PCB board 3. As shown by FIG. 2, the opening portion 43 is provided for exposing the plurality of terminals 38 held by the terminal holder 35 from the accommodating portion 41 to outside by way of the opening portion 43. Further, according to the embodiment, in attaching the rear cover 4 to the liquid crystal display panel 2 and the PCB board 3, as shown by FIG. 6, an upper portion of the holder portion 35b of the terminal holder 35 is constituted to be brought into contact with an upper face on an inner peripheral side of the opening portions 43. Thereby, a region of the accommodating portion 41 formed with the opening portion 43 is reinforced in a state of being supported by the terminal holder 35. Further, the attaching recess portion 44 is formed at one end in Y direction of the accommodating portion 41. The attaching recess portion 44 is attached with a leg member (not illustrated) for supporting the liquid crystal television 1. Further, a reinforcing plate 45 made of a metal is attached to an inner face side of the accommodating portion 41 of the rear cover 4. The reinforcing plate 45 is provided for preventing the accommodating portion 41 of the rear cover 4 made of resin from being destructed by a stress applied on the leg member in attaching the leg member (not illustrated) of the rear cover 4. According to the embodiment, as shown by FIG. 2 and FIG. 5, by attaching the reinforcing plate 45 to the rear cover 4, a region from one end in Y direction to substantially a center in Y direction of the accommodating portion 41 is reinforced.

Figure 7:
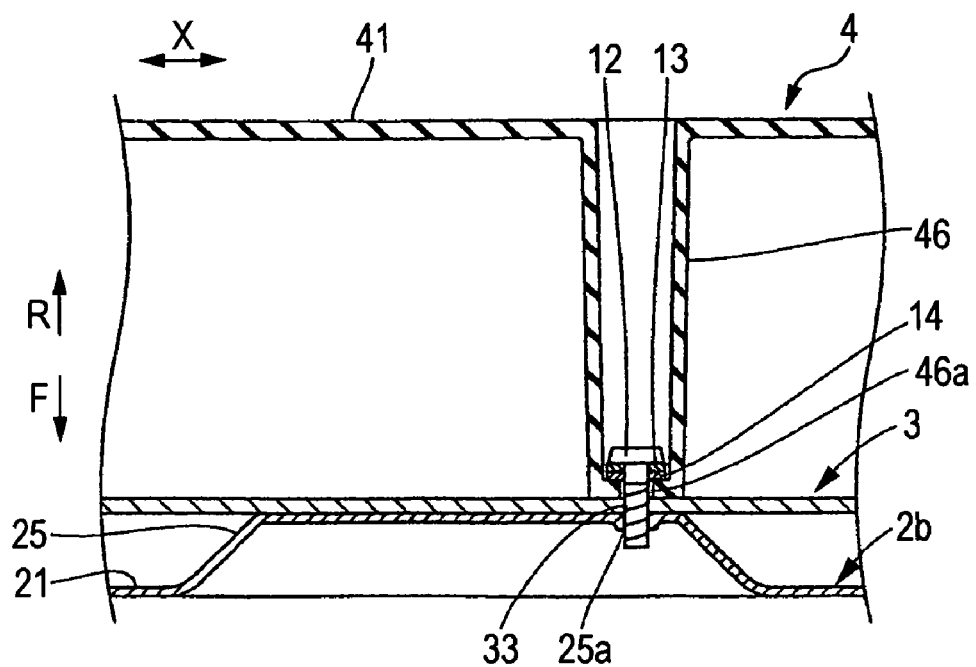
FIG. 7 is a sectional view taken along a line 200-200 in FIG. 2.
Figure 8:
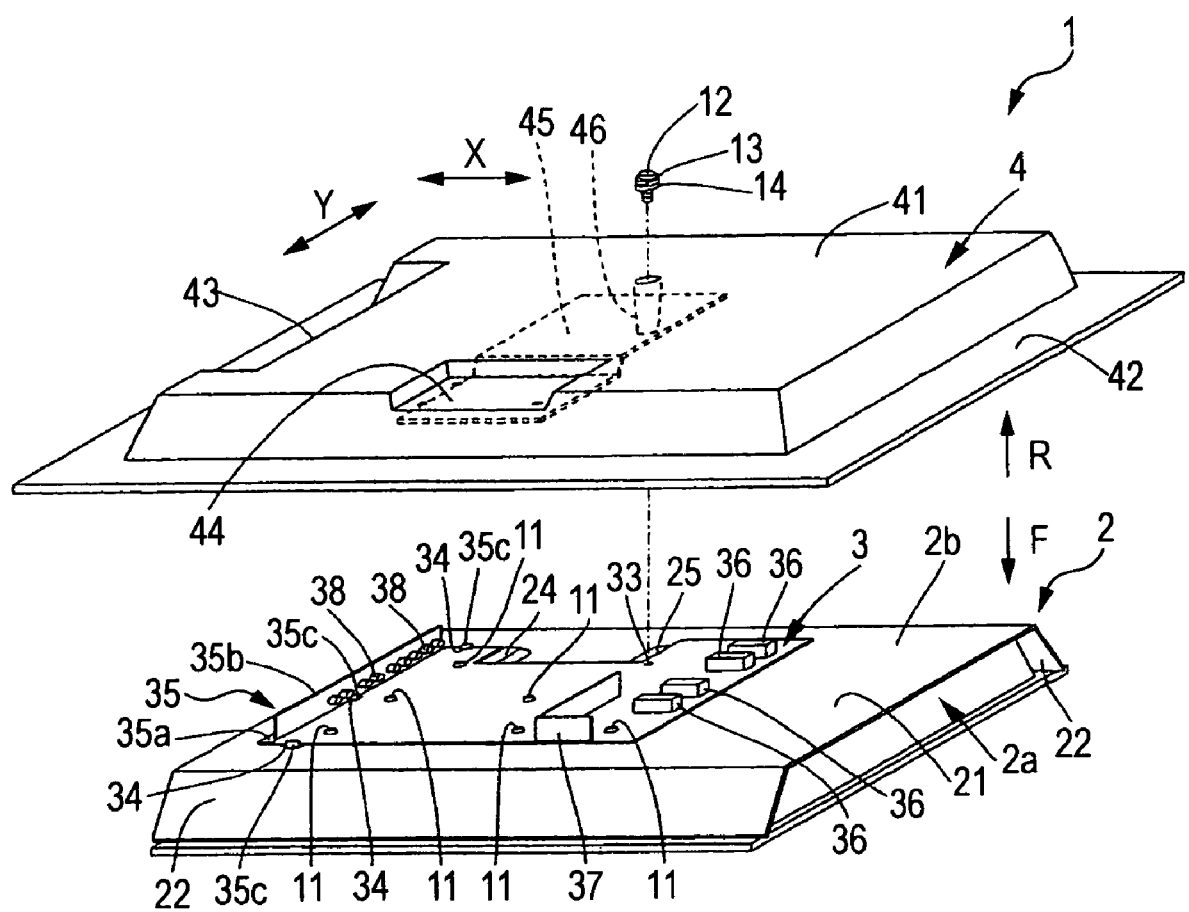
FIG. 8 is a perspective view showing a portion of a step of integrating the liquid crystal television according to the embodiment shown in FIG. 1.

The inner face side of the accommodating portion 41 of the rear cover 4 made of resin is integrally formed with a boss 46 having a screw hole 46a (refer to FIG. 5 and FIG. 7) at a front end thereof as shown by FIG. 1, FIG. 2, FIG. 5 and FIG. 7. As shown by FIG. 7, the boss 46 is formed at a position of the rear cover 4 in correspondence with the hole portion 33 of the PCB board 3 to project to the PCB board 3. Further, as shown by FIG. 2, the boss 46 is formed at a vicinity of a position proximate to other end in Y direction of the accommodating portion 41 which is not reinforced by the reinforcing plate 45 and a vicinity of a position in correspondence with the two electronic parts 36 on other end side in Y direction of the four electronic parts 36 of the PCB board 3. Further, according to the embodiment, as shown by FIG. 1 and FIG. 7, the rear cover 4, the PCB board 3 and the frame 2b of the liquid crystal display panel 2 are fixed to each other by inserting and fastening a screw 12 integrated with a spring washer 13 and a flat washer 14 by way of the screw inserting hole 46a (refer to FIG. 7) of the boss 46 and the hole portion 33 of the PCB board 3.

Next, a step of integrating the liquid crystal television 1 according to the embodiment will be explained in reference to FIG. 1, FIG. 2 and FIG. 8. First, the PCB board 3 shown in FIG. 1 is attached to the frame 2b of the liquid crystal display panel 2 by using the eight screws 11. That is, the eight screws 11 are inserted and fastened into the screw holes 23a, 24a formed at the frame 2b of the liquid crystal display panel 2 by way of the hole portions 31 and 32 of the PCB board 3. Thereby, as shown by FIG. 8, the PCB board 3 is fixed to the frame 2b of the liquid crystal display panel 2.

Here, according to the embodiment, the rear cover 4 made of resin is attached to the frame 2b made of a metal of the liquid crystal display panel 2 fixed with the PCB board 3 by using the single screw 12. Specifically, the screw 12 integrated with the spring washer 13 and the flat washer 14 shown in FIG. 8 is inserted into the screw inserting hole 46a of the boss 46 formed at the accommodating portion 41 of the rear cover 4 from an arrow mark R direction side. Further, the screw 12 is further inserted and fastened into the screw hole 25a formed at the frame 2b of the liquid crystal display panel 2 by way of the hole portion 33 of the PCB board 3. Thereby, the liquid crystal display panel 2, the PCB board 3, and the rear cover 4 are fixed to each other to finish integrating the liquid crystal television 1 shown in FIG. 2.

According to the embodiment, the rear cover 4 made of resin can be fixed to the liquid crystal display panel 2 and the PCB board 3 at a portion of the boss 46 by fixing the liquid crystal display panel 2 and the PCB board 3 and the rear cover 4 by forming the boss 46 extended to the PCB board 3 and having the screw inserting hole 46a at the front end at the vicinity of the position of the rear cover 4 made of resin in correspondence with the two electronic parts 36 on the other end side in Y direction of the four electronic parts 36 of the PCB board 3 and inserting and fastening the screw 12 into the screw inserting hole 46a of the boss 46 and therefore, the rear cover 4 made of resin can be restrained from being deformed by heat generated by the electronic parts 36 of the PCB board 3.

Further, according to the embodiment, as described above, a portion for fixing the liquid crystal display panel 2 and the PCB board 3 of the background art can be used for fixing the liquid crystal display panel 2 and the PCB board 3 and the rear cover 4 as it is by fixing the liquid crystal display panel 2 and the PCB board 3 and the rear cover 4 by inserting and fastening the screw 12 for fixing the liquid crystal display panel 2 and the PCB board 3 into the screw inserting hole 46a of the boss 46 and therefore, a number of screws used in the fixing can be restrained from being increased. Thereby, the liquid crystal display panel 2 and the PCB board 3 and the rear cover 4 can be fixed without increasing a number of parts.

Further, according to the embodiment, as described above, it is not necessary to newly provide a region for screwing on the PCB board 3 by fixing the liquid crystal display panel 2 and the PCB board 3 and the rear cover 4 by inserting and fastening the screw 12 for fixing the liquid crystal display panel 2 and the PCB board 3 into the screw inserting hole 46a of the boss 46 and therefore, the PCB board 3 can be prevented from being large-sized.

Further, according to the embodiment, as described above, by fixing the rear cover 4 made of resin to the frame 2b made of a metal, since the metal is a material having a strength higher than that of resin and is difficult to be deformed by heat, a base portion of the frame 2b fixed with the rear cover 4 made of resin is difficult to be destructed by impact or deformed by heat. Thereby, in comparison with a case of fixing the rear cover 4 made of resin to a member made of resin, a strength of fixing the rear cover 4 made of resin can be increased and the rear cover 4 made of resin can further effectively be restrained from being deformed by heat.

Further, according to the embodiment, as described above, by forming the boss 46 at the vicinity of the center of the accommodating portion 41 of the rear cover 4 made of resin capable of including the liquid crystal display panel 2 and the PCB board 3 at inside thereof, even when the rear cover 4 made of resin is formed in a recess shape which is difficult to diverge heat to outside for including the liquid crystal display panel 2 and the PCB board 3 at inside thereof, by the boss 46, the vicinity of the center of the accommodating portion 41 of the rear cover 4 which is liable to be deformed can be fixed and therefore, the rear cover 4 can effectively be restrained from being deformed by heat.

Further, according to the embodiment, as described above, by integrally forming the boss 46 at the rear cover 4 made of resin, in comparison with the case of forming the boss 46 separately from the rear cover 4 made of resin, a number of parts can be restrained from being increased.

Further, the embodiment disclosed this time is an exemplification in all the respect and is to be regarded not to be restrictive. The range of the invention is indicated not by the above-described explanation of the embodiment but by the scope of claims and includes all the changes within the significance and the range of equivalency with the scope of claims.

For example, although according to the above-described embodiment, there is shown an example of applying the embodiment as an example of the liquid crystal display apparatus, the invention is not limited thereto but the invention is applicable also to a liquid crystal display apparatus of a structure having a cabinet other than the liquid crystal television.

Further, although according to the embodiments, there is shown an example of fixing the rear cover made of resin to the frame made of a metal by using the boss formed at the rear cover, the invention is not limited thereto but a rear cover made of resin may be fixed to a frame member made of resin by using the boss formed at the rear cover.

Further, although according to the above-described embodiment, an explanation has been given of an example of forming the accommodating portion in the recess shape capable of including the liquid crystal display panel and the PCB board and providing the boss at the vicinity of center of the accommodating portion of the rear cover, the invention is not limited thereto but a similar effect can be achieved even when the rear cover is formed in a flat plate shape and a boss is provided at a vicinity of a center of the rear cover in the flat plate shape.

Further, although according to the above-described embodiment, as shown by FIG. 1, an explanation has been given of the example of forming the single boss at the position of the accommodating portion 41 of the rear cover 4 in correspondence with the hole portion 33 of the PCB board 3, the invention is not limited thereto but, for example, bosses may be formed also at positions of the accommodating portion 41 of the rear cover 4 in correspondence with the hole portions 31 and 32 of the PCB board 3 other than the position of the accommodating portion 41 of the rear cover 4 in correspondence with the hole portion 33 of the PCB board 3.

What is claimed is:

1. A liquid crystal television comprising:
a liquid crystal display panel including a metal frame formed with a first hole;
a printed circuit board formed with a second hole and provided with a heat source;
a resin cabinet disposed at a side opposite to the frame of the liquid crystal display panel with respect to the printed circuit board, the cabinet including a recess portion capable of accommodating the liquid crystal display panel and the printed circuit board therein; and
a resin boss integrally formed at a vicinity of a center of the recess portion of the cabinet, protruded toward the printed circuit board in the vicinity of the heat source, and formed with a third hole at a front end thereof,
wherein the printed circuit board and the cabinet are fixed to the frame by inserting a screw into the third hole and the second hole and fastening the screw to the first hole of the frame.

2. A liquid crystal display apparatus comprising:
a liquid crystal display panel formed with a first hole;
a board formed with a second hole and provided with a heat source;
a resin cabinet disposed at a side opposite to the liquid crystal display panel with respect to the board,
a resin boss integrally formed on the cabinet, protruded toward the board in the vicinity of the heat source, and formed with a third hole at a front end thereof,
wherein the board and the cabinet are fixed to the liquid crystal display by inserting a screw into the third hole and the second hole and fastening the screw to the first hole of the liquid crystal display panel.

3. The liquid crystal display apparatus according to claim 2,
wherein the liquid crystal display panel includes a metal frame, and
wherein the first hole is formed on the frame.

4. The liquid crystal display apparatus according to claim 2,
wherein the cabinet includes a recess portion capable of accommodating the liquid crystal display panel and the board therein; and
wherein the boss is formed at a vicinity of a center of the recess portion of the cabinet.

* * * * *